United States Patent
Iizuka et al.

(10) Patent No.: US 8,678,973 B2
(45) Date of Patent: Mar. 25, 2014

(54) AUTOMATIC TRANSMISSION

(71) Applicant: Honda Motor Co., Ltd., Tokyo (JP)

(72) Inventors: Kohei Iizuka, Wako (JP); Soichi Sugino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/784,834

(22) Filed: Mar. 5, 2013

(65) Prior Publication Data

US 2013/0244823 A1    Sep. 19, 2013

(30) Foreign Application Priority Data

Mar. 19, 2012    (JP) ................................. 2012-062797

(51) Int. Cl.
   *F16H 3/44*    (2006.01)
(52) U.S. Cl.
   USPC .......................................... 475/287; 475/330
(58) Field of Classification Search
   USPC ......... 475/271, 275–278, 280, 281, 286, 287, 475/297, 903
   See application file for complete search history.

(56) References Cited

U.S. PATENT DOCUMENTS

| | | | | |
|---|---|---|---|---|
| 7,566,285 | B2* | 7/2009 | Shim | 475/278 |
| 8,277,355 | B2* | 10/2012 | Hart et al. | 475/282 |
| 8,343,005 | B2* | 1/2013 | Hart et al. | 475/276 |
| 8,343,007 | B2* | 1/2013 | Hart et al. | 475/288 |
| 2011/0256977 | A1* | 10/2011 | Hart et al. | 475/275 |
| 2012/0108382 | A1* | 5/2012 | Saitoh et al. | 475/276 |
| 2012/0108383 | A1* | 5/2012 | Saitoh et al. | 475/276 |
| 2012/0115670 | A1* | 5/2012 | Saitoh et al. | 475/276 |

FOREIGN PATENT DOCUMENTS

| | | |
|---|---|---|
| JP | 2000-161450 | 6/2000 |
| JP | 2001-182785 | 7/2001 |
| JP | 2002-323098 | 11/2002 |
| JP | 2005-273768 | 10/2005 |

* cited by examiner

*Primary Examiner* — Justin Holmes
(74) *Attorney, Agent, or Firm* — Ditthavong Mori & Steiner, P.C.

(57) ABSTRACT

An automatic transmission includes an input shaft, a first planetary gear mechanism, a second planetary gear mechanism, a third planetary gear mechanism, a fourth planetary gear mechanism, a first engagement device, a second engagement device, a third engagement device, a fourth engagement device, a fifth engagement device, a sixth engagement device, and a seventh engagement device. Ten forward gears of the automatic transmission are established by bringing at least three of the first to seventh engagement devices into the engagement state.

12 Claims, 5 Drawing Sheets

|      | B1  | B2  | B3  | B4 | C1 | C2 | C3 | F1 |
|------|-----|-----|-----|----|----|----|----|----|
| Rvs  | O   | O   |     |    |    | O  |    |    |
| 1st  | O   | (O) |     |    |    |    | O  | O  |
| 2nd  |     | (O) | O   |    |    |    | O  | O  |
| 3rd  |     | (O) |     |    |    | O  | O  | O  |
| 4th  |     |     | O   |    |    | O  | O  |    |
| 5th  | O   |     |     |    |    | O  | O  |    |
| 6th  |     |     |     |    | O  | O  | O  |    |
| 7th  | O   |     |     |    | O  |    | O  |    |
| 8th  | O   |     |     |    | O  | O  |    |    |
| 9th  |     |     | O   |    | O  | O  |    |    |
| 10th |     |     | O   | O  | O  |    |    |    |

FIG. 3B

|      | GEAR RATIO |
|------|------------|
| Rvs  | 3.989      |
| 1st  | 5.147      |
| 2nd  | 3.380      |
| 3rd  | 2.342      |
| 4th  | 1.656      |
| 5th  | 1.349      |
| 6th  | 1.000      |
| 7th  | 0.839      |
| 8th  | 0.642      |
| 9th  | 0.539      |
| 10th | 0.475      |

FIG. 3C

|      | COMMON RATIO |
|------|--------------|
| 1-2  | 1.523        |
| 2-3  | 1.443        |
| 3-4  | 1.415        |
| 4-5  | 1.227        |
| 5-6  | 1.349        |
| 6-7  | 1.191        |
| 7-8  | 1.307        |
| 8-9  | 1.190        |
| 9-10 | 1.135        |

FIG. 3D

| GEAR RATIO h | 1.885  |
|--------------|--------|
| GEAR RATIO i | 2.236  |
| GEAR RATIO j | 1.779  |
| GEAR RATIO k | 1.793  |
| RATIO RANGE  | 10.830 |

AUTOMATIC TRANSMISSION

CROSS-REFERENCE TO RELATED APPLICATIONS

The present application claims priority under 35 U.S.C. §119 to Japanese Patent Application No. 2012-062797, filed Mar. 19, 2012, entitled "Automatic Transmission." The contents of this application are incorporated herein by reference in their entirety.

BACKGROUND OF THE INVENTION

1. Field of the Invention

The present disclosure relates to an automatic transmission.

2. Discussion of the Background

There is a known automatic transmission capable of providing eight forward gears using a first planetary gear mechanism for input, two planetary gear mechanisms consisting of second and third planetary gear mechanisms for changing the speed, and six engagement mechanisms (see, for example, Japanese Unexamined Patent Application Publication No. 2005-273768).

In the automatic transmission described in Japanese Unexamined Patent Application Publication No. 2005-273768, the first planetary gear mechanism for input is a double-pinion planetary gear mechanism that includes a first sun gear, a first ring gear, and a first carrier that supports a pair of first pinions. The pair of first pinions mesh with each other, one of the first pinions meshes with the first sun gear, and the other meshes with the first ring gear. The first carrier supports the first pinions such that they are rotatable about their respective axes and about the axis of the first sun gear.

This double-pinion planetary gear mechanism is also called a plus planetary gear mechanism or positive planetary gear mechanism because when the carrier is fixed the sun gear and ring gear rotate in the same direction. When the ring gear is fixed the sun gear and carrier rotate in different directions.

In the first planetary gear mechanism, the first sun gear is a fixed element fixed to a transmission case, the first carrier is an input element coupled to the input shaft, and the first ring gear is an output element that reduces the rotational speed of the first carrier, which is the input element, and outputs the rotation.

The two planetary gear mechanisms for changing the speed are of Ravigneaux type made up of a second sun gear, a third sun gear, a second ring gear integral with a third ring gear, and a second carrier that supports a pair of second pinions. The pair of second pinions mesh with each other, one of the second pinions meshes with the second sun gear and second ring gear, and the other meshes with the third sun gear. The second carrier supports the second pinions such that they are rotatable about their respective axes, one of the second pinions is rotatable about the second sun gear, and the other is rotatable about the third sun gear.

The above-described Ravigneaux planetary gear mechanisms form four rotational elements. These four rotational elements are arranged at intervals corresponding to the gear ratios in a collinear diagram (a diagram that illustrates a ratio among relative rotational speeds of rotational elements using straight lines). When the four rotational elements in the collinear diagram are defined as a first rotational element, a second rotational element, a third rotational element, and a fourth rotational element from one side in sequence, the first rotational element is the second sun gear, the second rotational element is the second carrier integral with the third carrier, the third rotational element is the second ring gear, which is integral with the third ring gear, and the fourth rotational element is the third sun gear.

The six engagement mechanisms include a first wet multi-plate clutch that releasably couples the first ring gear being the output element of the first planetary gear mechanism and the fourth rotational element consisting of the third sun gear, a second wet multi-plate clutch that releasably couples the input shaft and the second rotational element consisting of the second carrier, a third wet multi-plate clutch that releasably couples the first ring gear being the output element and the first rotational element consisting of the second sun gear, a fourth wet multi-plate clutch that releasably couples the first carrier being the input element and the first rotational element consisting of the second sun gear, a first brake that releasably fixes the first rotational element consisting of the second sun gear to the transmission case, and a second brake that releasably fixes the second rotational element consisting of the second carrier to the transmission case.

With the above-described configuration, the first gear is established by the coupling state of the first wet multi-plate clutch and the fixing state of the second brake, the second gear is established by the coupling state of the first wet multi-plate clutch and the fixing state of the first brake, the third gear is established by the coupling state of each of the first wet multi-plate clutch and third wet multi-plate clutch, and the fourth gear is established by the coupling state of the first wet multi-plate clutch and fourth wet multi-plate clutch.

The fifth gear is established by the coupling state of each of the first wet multi-plate clutch and second wet multi-plate clutch, the sixth gear is established by the coupling state of each of the second wet multi-plate clutch and fourth wet multi-plate clutch, the seventh gear is established by the coupling state of each of the second wet multi-plate clutch and third wet multi-plate clutch, and the eighth gear is established by the coupling state of the second wet multi-plate clutch and the fixing state of the first brake.

In the above-described known automatic transmission, the number of engagement mechanisms being in the coupling state or fixing state at each gear is two. Thus, the above-described automatic transmission has the disadvantage of a large friction loss resulting from dragging of the remaining four opened engagement mechanisms and a decreased efficiency of the automatic transmission.

In addition, to achieve 10 or more forward gears, it is necessary to add at least two engagement mechanisms. In this case, the number of engagement mechanisms that are opened at each gear is six or more, and the friction loss further increases.

SUMMARY OF THE INVENTION

According to one aspect of the present invention, an automatic transmission includes an input shaft, a first planetary gear mechanism, a second planetary gear mechanism, a third planetary gear mechanism, a fourth planetary gear mechanism, a first engagement device, a second engagement device, a third engagement device, a fourth engagement device, a fifth engagement device, a sixth engagement device, and a seventh engagement device. The input shaft is rotatably supported in a transmission case and rotatable by power from a driving source. A rotational speed of the input shaft is changeable to any of a plurality of rotational speeds to be output through an output member. The first planetary gear mechanism includes a first sun gear, a first carrier, and a first ring gear which are defined as a first element, a second element, and a third element in a collinear diagram that illustrates a ratio among relative rotational speeds of the first to third elements using straight lines. The first to third elements are arranged in sequence from one side of the collinear diagram at intervals corresponding to a gear ratio of the first to third elements in the collinear diagram. The second planetary gear mechanism includes a second sun gear, a second carrier, and a second ring gear. The third planetary gear mechanism includes a third sun gear, a third carrier, and a third ring gear. The second sun gear, the second carrier, the second ring gear, the third sun gear, the third carrier, and the third ring gear are defined as first to fourth rotational elements in the collinear diagram that illustrates a ratio among relative rotational speeds of the first to fourth rotational elements using straight lines. The first to fourth rotational elements are arranged in sequence from one side of the collinear diagram in the collinear diagram. The fourth planetary gear mechanism includes a fourth sun gear, a fourth carrier, and a fourth ring gear which are defined as a fourth element, a fifth element, and a sixth element in the collinear diagram that illustrates a ratio among relative rotational speeds of the fourth to sixth elements using straight lines. The fourth to sixth elements are arranged in sequence from one side of the collinear diagram at intervals corresponding to a gear ratio of the fourth to sixth elements in the collinear diagram. The first element is coupled to the input shaft. The fourth element is coupled to the output member. The third element and the sixth element are coupled to each other to form a first connected member. The third element and the fifth element are coupled to each other to form a second connected member. The first engagement device is switchable between an engagement state where the first element is connected to the second rotational element and a release state where the first element is disconnected from the second rotational element. The second engagement device is switchable between an engagement state where the first element is connected to the first rotational element and a release state where the first element is disconnected from the first rotational element. The third engagement device is switchable between an engagement state where the second element is connected to the fourth rotational element and a release state where the second element is disconnected from the fourth rotational element. The fourth engagement device is switchable between an engagement state where the first connected member is connected to the transmission case and a release state where the first connected member is disconnected from the transmission case. The fifth engagement device is switchable between an engagement state where the second rotational element is connected to the transmission case and a release state where the second rotational element is disconnected from the transmission case. The sixth engagement device is switchable between an engagement state where the second element is connected to the transmission case and a release state where the second element is disconnected from the transmission case. The seventh engagement device is switchable between an engagement state where the first rotational element is connected to the transmission case and a release state where the first rotational element is disconnected from the transmission case. Ten forward gears of the automatic transmission are established by bringing at least three of the first to seventh engagement devices into the engagement state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
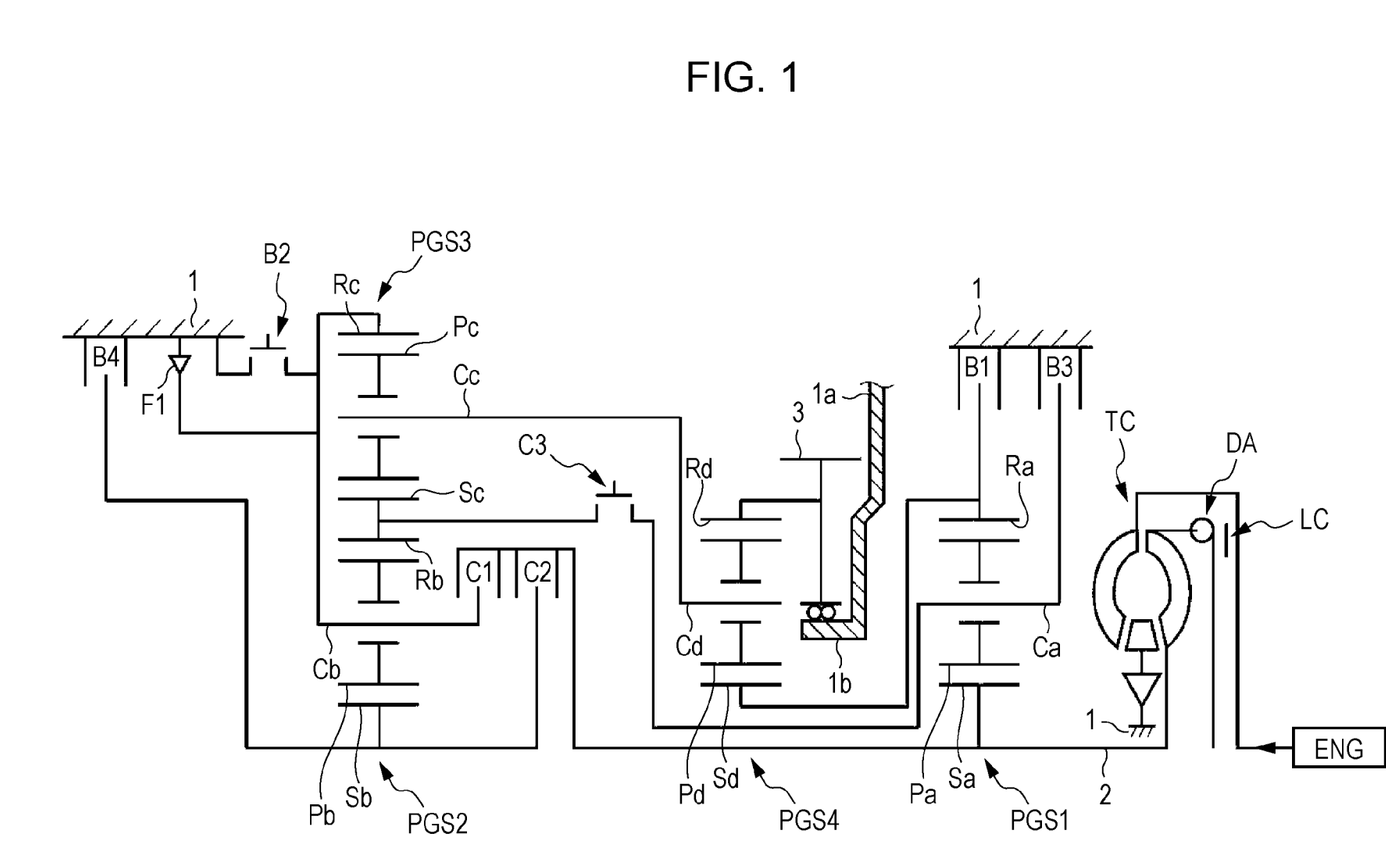
FIG. 1 is a schematic diagram that illustrates an upper half portion of an automatic transmission according to a first embodiment.

FIG. 1 illustrates an upper half portion of an automatic transmission according to a first embodiment. The automatic transmission includes an input shaft 2 rotatably supported in a transmission case 1 and an output member 3 including an output gear arranged coaxially with the input shaft 2. The input shaft 2 is configured to receive power from an engine ENG as a driving source through a torque converter TC. The power of the output member 3 is transferred to right and left driving wheels of a vehicle through a differential gear and a propeller shaft (not depicted).

The torque converter TC is a fluid torque converter that uses fluid as a medium for transferring power and includes a lock-up clutch LC that can directly transfer power from the engine ENG to the input shaft 2. When the lock-up clutch LC is engaged, torque fluctuations are undesirably transferred to the input shaft 2. To address this, a torsional damper DA is disposed to absorb the torque fluctuations of the engine ENG with its elastic force.

Four planetary gear mechanisms consisting of first to fourth planetary gear mechanisms PGS1 to PGS4 are arranged coaxially with the input shaft 2 in the transmission case 1. The first planetary gear mechanism PGS1 is a single-pinion planetary gear mechanism that includes a sun gear Sa, a ring gear Ra, and a carrier Ca supporting a pinion Pa meshing with the sun gear Sa and ring gear Ra such that it is rotatable about its axis and about the sun gear Sa.

This single-pinion planetary gear mechanism is also called a minus planetary gear mechanism or negative planetary gear mechanism because when the carrier is fixed the sun gear and ring gear rotate in different directions. When the ring gear is fixed the sun gear and carrier rotate in the same direction.

Figure 2:
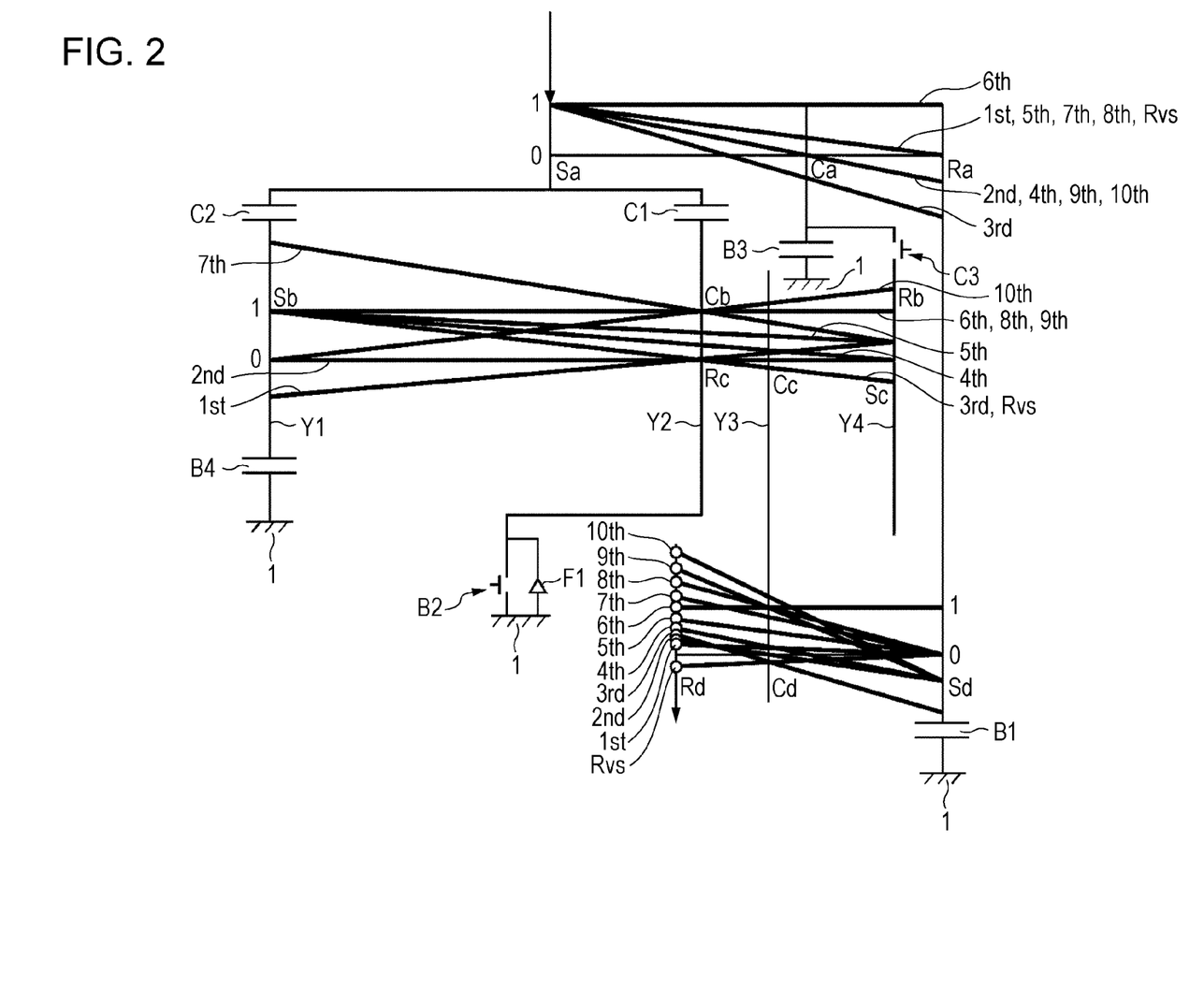
FIG. 2 is a collinear diagram that illustrates a ratio among relative rotational speeds of elements of first to fourth planetary gear mechanisms according to the first embodiment.

Referring to the collinear diagram (diagram that illustrates a ratio among relative rotational speeds of the three elements using straight lines (speed lines)) for the first planetary gear mechanism PGS1 depicted in the upper stage in FIG. 2, when the three elements Sa, Ca, and Ra of the first planetary gear mechanism PGS1 are arranged at intervals corresponding to the gear ratio and they are defined as a first element, a second element, and a third element in sequence from the left, the first element is the sun gear Sa, the second element is the carrier Ca, and the third element is the ring gear Ra.

Here, the ratio of the interval between the sun gear Sa and carrier Ca to the interval between the carrier Ca and ring gear Ra is set at h:1, where h represents the gear ratio (the number of teeth of the ring gear/the number of teeth of the sun gear) of the first planetary gear mechanism PGS1. In the collinear diagram, the lower horizontal line indicates that the rotational speed is "0," and the upper horizontal line indicates that the rotational speed is "1," which is the same as the rotational speed of the input shaft 2.

The second planetary gear mechanism PGS2 is also a single-pinion planetary gear mechanism that includes a sun gear Sb, a ring gear Rb, and a carrier Cb supporting a pinion Pb meshing with the sun gear Sb and ring gear Rb such that it is rotatable about its axis and about the sun gear Sb.

The third planetary gear mechanism PGS3 is also a single-pinion planetary gear mechanism that includes a sun gear Sc, a ring gear Rc, and a carrier Cc supporting a pinion Pc meshing with the sun gear Sc and ring gear Rc such that it is rotatable about its axis and about the sun gear Sc.

The second planetary gear mechanism PGS2 and third planetary gear mechanism PGS3 form four rotational elements by coupling two of the three elements consisting of the sun gear Sb, carrier Cb, and ring gear Rb in the second planetary gear mechanism PGS2 to two of the three elements consisting of the sun gear Sc, carrier Cc, and ring gear Rc in the third planetary gear mechanism PGS3, respectively.

Referring to the collinear diagram (diagram that illustrates a ratio among relative rotational speeds of the four rotational elements using straight lines (speed lines)) for the second planetary gear mechanism PGS2 and third planetary gear mechanism PGS3 depicted in the middle stage in FIG. 2, when the rotational elements are defined as a first rotational element Y1, a second rotational element Y2, a third rotational element Y3, and a fourth rotational element Y4 in sequence from the left, the first rotational element Y1 is the sun gear Sb in the second planetary gear mechanism PGS2, the second rotational element Y2 is the one in which the carrier Cb in the second planetary gear mechanism PGS2 and the ring gear Rc in the third planetary gear mechanism PGS3 are coupled, the third rotational element Y3 is the carrier Cc in the third planetary gear mechanism PGS3, and the fourth rotational element Y4 is the one in which the ring gear Rb in the second planetary gear mechanism PGS2 and the sun gear Sc in the third planetary gear mechanism PGS3 are coupled.

The ratio among the intervals of the first to fourth rotational elements is ij-1:1:j, where i denotes the gear ratio of the second planetary gear mechanism PGS2 and j denotes the gear ratio of the third planetary gear mechanism PGS3.

The fourth planetary gear mechanism PGS4 is also a single-pinion planetary gear mechanism that includes a sun gear Sd, a ring gear Rd, and a carrier Cd supporting a pinion Pd meshing with the sun gear Sd and ring gear Rd such that it is rotatable about its axis and about the sun gear Sd.

Referring to the collinear diagram for the fourth planetary gear mechanism PGS4 depicted in the lower stage in FIG. 2, when the three elements Sd, Cd, and Rd of the fourth planetary gear mechanism PGS4 are arranged at intervals corresponding to the gear ratio and they are defined as a fourth element, a fifth element, and a sixth element in sequence from the left, the fourth element is the ring gear Rd, the fifth element is the carrier Cd, and the sixth element is the sun gear Sd. The ratio of the interval between the sun gear Sd and carrier Cd to the interval between the carrier Cd and ring gear Rd is set at k:1, where k represents the gear ratio of the fourth planetary gear mechanism PGS4.

The sun gear Sa (first element) in the first planetary gear mechanism PGS1 is coupled to the input shaft 2. The ring gear Rd (fourth element) in the fourth planetary gear mechanism PGS4 is coupled to the output member 3 as the output gear.

The ring gear Ra (third element) in the first planetary gear mechanism PGS1 and the sun gear Sd (sixth element) in the fourth planetary gear mechanism PGS4 being coupled to each other forms a first connected member Ra-Sd. The third rotational element Y3 and the carrier Cd (fifth element) in the fourth planetary gear mechanism PGS4 being coupled to each other forms a second connected member Y3-Cd.

The automatic transmission according to the first embodiment includes, as the engagement mechanisms, three clutches consisting of first to third clutches C1 to C3 and four brakes consisting of first to fourth brakes B1 to B4. The first clutch C1 is a wet multi-plate clutch and is switchable between a coupling state where coupling between the sun gear Sa (first element) in the first planetary gear mechanism PGS1 and the second rotational element Y2 is made and a release state where the coupling is released.

The second clutch C2 is a wet multi-plate clutch and is switchable between a coupling state where coupling between the sun gear Sa (first element) in the first planetary gear mechanism PGS1 and the first rotational element Y1 is made and a release state where the coupling is released.

The third clutch C3 is a meshing mechanism including a dog clutch or a synchromesh mechanism having the synchronizing function and is switchable between a coupling state where coupling between the carrier Ca (second element) in the first planetary gear mechanism PGS1 and the fourth rotational element Y4 is made and a release state where the coupling is released. The third clutch C3 may be a wet multi-plate clutch.

The first brake B1 is a wet multi-plate clutch and is switchable between a fixing state where fixing of the first connected member Ra-Sd to the transmission case 1 is made and a release state where the fixing is released.

The second brake B2 is a meshing mechanism including a dog clutch or a synchromesh mechanism having the synchronizing function and is switchable between a fixing state where fixing of the second rotational element Y2 to the transmission case 1 is made and a release state where the fixing is released. A one-way clutch F1 that allows forward rotation of the second rotational element Y2 and prevents reverse rotation thereof is disposed in the vicinity of the second brake B2.

The third brake B3 is a wet multi-plate clutch and is switchable between a fixing state where fixing of the carrier Ca (second element) in the first planetary gear mechanism PGS1 to the transmission case 1 is made and a release state where the fixing is released. The fourth brake B4 is a wet multi-plate brake and is switchable between a fixing state where fixing of the first rotational element Y1 to the transmission case 1 is made and a release state where the fixing is released.

The state of each of the clutches C1 to C3 and brakes B1 to B4 is switchable by a transmission control unit (TCU) (not depicted) on the basis of vehicle information, such as a running speed.

The third planetary gear mechanism PGS3 is arranged outside in the radial direction of the second planetary gear mechanism PGS2. The ring gear Rb in the second planetary gear mechanism PGS2 and the sun gear Sc in the third planetary gear mechanism PGS3 are integrally coupled to each other. Because of the arrangement of the third planetary gear mechanism PGS3 outside in the radial direction of the second planetary gear mechanism PGS2, the second planetary gear mechanism PGS2 and third planetary gear mechanism PGS3 overlap each other in the radial direction, and the axial length of the automatic transmission can be reduced.

The second planetary gear mechanism PGS2 and third planetary gear mechanism PGS3 overlap each other at least in part in the radial direction, and this can lead to a reduced axial length. When they fully overlap each other in the radial direction, the axial length can be minimized.

The output member 3 including the output gear is arranged between the first planetary gear mechanism PGS1 and fourth planetary gear mechanism PGS4. The transmission case 1 is provided with a side wall 1a extending internally in the radial direction between the output member 3 and the first planetary gear mechanism PGS1. The side wall 1a is provided with a cylindrical portion 1b extending along the axial direction of the output member 3. The output member 3 is supported by the cylindrical portion 1b with a bearing disposed therebetween. This configuration enables the output member 3 to be firmly supported by the cylindrical portion 1b having a high mechanical strength linked to the transmission case 1.

To establish the first gear in the automatic transmission, the third clutch C3 is brought into the coupling state, and the first brake B1 is brought into the fixing state. The fixing state of the first brake B1 causes the rotational speed of the first connected member Ra-Sd to be "0."

The coupling state of the third clutch C3 causes the carrier Ca (second element) in the first planetary gear mechanism PGS1 and the fourth rotational element Y4 to be coupled to each other and rotate at the same speed. The action of the one-way clutch F1 causes the rotational speed of the second rotational element Y2 to be "0." The rotational speed of the ring gear Rd (fourth element) in the fourth planetary gear mechanism PGS4 coupled to the output member 3 corresponds to "1st" illustrated in FIG. 2, and the first gear is established.

Because the second brake B2 is in the release state at the first gear, the number of opened engagement mechanisms is "5." However, because the second brake B2 is a meshing mechanism, even when the second brake B2 is brought into the release state, the friction loss can be more suppressed than that when it is a wet multi-plate brake. In addition, because the rotational element of the second rotational element Y2 is made to be "0" by the action of the one-way clutch F1, even if the second brake B2 is a wet multi-plate brake, no friction loss occurs. Accordingly, the number of opened engagement mechanisms at the first gear is actually "4."

When the second brake B2 is also brought into the fixing state at the first gear, engine braking can also work.

To establish the second gear, the third clutch C3 is brought into the coupling state, and the third brake B3 is brought into the fixing state. The fixing state of the third brake B3 causes the rotational speed of the carrier Ca (second element) in the first planetary gear mechanism PGS1 to be "0." The coupling state of the third clutch C3 causes the rotational speed of the fourth rotational element Y4 to be "0." The coupling state of the third clutch C3 causes the rotational speed of the fourth rotational element Y4 to be "0," which is the same as the rotational speed of the carrier Ca (second element) in the first planetary gear mechanism PGS1. The action of the one-way clutch F1 causes the rotational speed of the second rotational element Y2 to be "0."

Of the four rotational elements consisting of the first to fourth rotational elements Y1 to Y4, the two rotational elements consisting of the second rotational element Y2 and fourth rotational element Y4 have the same rotational speed "0," and the rotational elements Y1 to Y4 are in a locked state where relative rotation thereof is disabled. The rotational speed of the third rotational element Y3, that is, the second connected member Y3-Cd is also "0." The rotational speed of the ring gear Rd (fourth element) in the fourth planetary gear mechanism PGS4 coupled to the output member 3 corresponds to "2nd" illustrated in FIG. 2, and the second gear is established.

Because the second brake B2 is in the release state at the second gear, the number of opened engagement mechanisms is "5." However, no friction loss occurs in the second brake B2, as in the case of the first gear. Accordingly, the number of opened engagement mechanisms at the second gear is actually "4." If the second brake B2 is brought into the fixing state at the second gear, engine braking can also work.

To establish the third gear, the second clutch C2 and third clutch C3 are brought into the coupling state. The coupling state of the second clutch C2 causes the sun gear Sa (first element) in the first planetary gear mechanism PGS1 and the first rotational element Y1 to rotate at the same speed "1." The coupling state of the third clutch C3 causes the carrier Ca (second element) in the first planetary gear mechanism PGS1 and the fourth rotational element Y4 to be coupled to each other and rotate at the same speed. The action of the one-way clutch F1 causes the rotational speed of the second rotational element Y2 to be "0; ." The rotational speed of the ring gear Rd (fourth element) in the fourth planetary gear mechanism PGS4 coupled to the output member 3 corresponds to "3rd" illustrated in FIG. 2, and the third gear is established.

Because the second brake B2 is in the release state at the third gear, the number of opened engagement mechanisms is "5." However, no friction loss occurs in the second brake B2, as in the case of the first or second gear. Accordingly, the number of opened engagement mechanisms at the third gear is actually "4." If the second brake B2 is brought into the fixing state at the third gear, engine braking can also work.

To establish the fourth gear, the second clutch C2 and third clutch C3 are brought into the coupling state, and the third brake B3 is brought into the fixing state. The coupling state of the second clutch C2 causes the sun gear Sa (first element) in the first planetary gear mechanism PGS1 and the first rotational element Y1 to rotate at the same speed "1." The fixing state of the third brake B3 causes the rotational speed of the carrier Ca (second element) in the first planetary gear mechanism PGS1 to be "0."

The coupling state of the third clutch C3 causes the rotational speed of the fourth rotational element Y4 to be "0," which is the same as the rotational speed of the carrier Ca (second element) in the first planetary gear mechanism PGS1. The rotational speed of the ring gear Rd (fourth element) in the fourth planetary gear mechanism PGS4 coupled to the output member 3 corresponds to "4th" illustrated in FIG. 2, and the fourth gear is established.

To establish the fifth gear, the second clutch C2 and third clutch C3 are brought into the coupling state, and the first brake B1 is brought into the fixing state. The coupling state of the second clutch C2 causes the sun gear Sa (first element) in the first planetary gear mechanism PGS1 and the first rotational element Y1 to rotate at the same speed "1." The coupling state of the third clutch C3 causes the carrier Ca (second element) in the first planetary gear mechanism PGS1 and the fourth rotational element Y4 to be coupled to each other and rotate at the same speed. The fixing state of the first brake B1 causes the rotational speed of the first connected member Ra-Sd to be "0." The rotational speed of the ring gear Rd (fourth element) in the fourth planetary gear mechanism PGS4 coupled to the output member 3 corresponds to "5th" illustrated in FIG. 2, and the fifth gear is established.

To establish the sixth gear, the three clutches consisting of the first to third clutches C1 to C3 are brought into the coupling state. The coupling state of the first clutch C1 and second clutch C2 causes the first rotational element Y1 and second rotational element Y2 to rotate at the same speed "1," and causes the four rotational elements consisting of the first to fourth rotational elements Y1 to Y4 to be in the locked state where relative rotation thereof is disabled and to rotate at the speed "1." The coupling state of the third clutch C3 causes the carrier Ca (second element) in the first planetary gear mechanism PGS1 to rotate at the speed "1," which is the same as the rotational speed of the fourth rotational element Y4.

Accordingly, the sun gear Sa (first element) and carrier Ca (second element) in the first planetary gear mechanism PGS1 also rotate at the same speed "1," the elements Sa, Ca, and Ra are in the locked state where relative rotation thereof is disabled, and the rotational speed of the ring gear Ra (third element), that is, the first connected member Ra-Sd is "1." The three elements Rd, Cd, Sd, being the fourth to sixth elements in the fourth planetary gear mechanism PGS4 are also in the locked state where relative rotation thereof is disabled. The rotational speed of the ring gear Rd (fourth element) in the fourth planetary gear mechanism PGS4 coupled to the output member 3 corresponds to "6th," where the rotational speed is "1," and the sixth gear is established.

To establish the seventh gear, the first clutch C1 and third clutch C3 are brought into the coupling state, and the first brake B1 is brought into the fixing state. The coupling state of the first clutch C1 causes the rotational speed of the sun gear Sa (first element) in the first planetary gear mechanism PGS1 and the second rotational element Y2 to rotate at the same speed "1." The coupling state of the third clutch C3 causes the carrier Ca (second element) in the first planetary gear mechanism PGS1 and fourth rotational element Y4 to rotate at the same speed.

The fixing state of the first brake B1 causes the rotational speed of the first connected member Ra-Sd to be "0." The rotational speed of the ring gear Rd (fourth element) in the fourth planetary gear mechanism PGS4 coupled to the output member 3 corresponds to "7th" illustrated in FIG. 2, and the seventh gear is established.

To establish the eighth gear, the first clutch C1 and second clutch C2 are brought into the coupling state, and the first brake B1 is brought into the fixing state. The coupling state of the first clutch C1 and second clutch C2 causes the first rotational element Y1 and second rotational element Y2 to rotate at the same speed "1," causes the four rotational elements consisting of the first to fourth rotational elements Y1 to Y4 to be in the locked state where relative rotation thereof is disabled and to rotate at the speed "1," and causes the rotational speed of the second connected member Y3-Cd to be "1."

The fixing state of the first brake B1 causes the first connected member Ra-Sd to be "0." The rotational speed of the ring gear Rd (fourth element) in the fourth planetary gear mechanism PGS4 coupled to the output member 3 corresponds to "8th" ((k+1)/k) illustrated in FIG. 2, and the eighth gear is established.

To establish the ninth gear, the first clutch C1 and second clutch C2 are brought into the coupling state, and the third brake B3 is brought into the fixing state. The coupling state of the first clutch C1 and second clutch C2 causes the first rotational element Y1 and second rotational element Y2 to rotate at the same speed "1," and cause the four rotational elements consisting of the first to fourth rotational elements Y1 to Y4 to be in the locked state where relative rotation thereof is disabled and to rotate at the speed "1."

The fixing state of the third brake B3 causes the rotational speed of the carrier Ca (second element) in the first planetary gear mechanism PGS1 to be "0." The rotational speed of the ring gear Rd (fourth element) in the fourth planetary gear mechanism PGS4 coupled to the output member 3 corresponds to "9th" illustrated in FIG. 2, and the ninth gear is established.

To establish the tenth gear, the first clutch C1 is brought into the coupling state, and the third brake B3 and fourth brake B4 are brought into the fixing state. The coupling state of the third brake B3 causes the rotational speed of the carrier Ca (second element) in the first planetary gear mechanism PGS1 to be "0." The coupling state of the first clutch C1 causes the sun gear Sa (first element) in the first planetary gear mechanism PGS1 and second rotational element Y2 to rotate at the same speed "1."

The fixing state of the fourth brake B4 causes the rotational speed of the first rotational element Y1 to be "0," and thus the rotational speed of the ring gear Rd (fourth element) in the fourth planetary gear mechanism PGS4 coupled to the output member 3 corresponds to "10th" illustrated in FIG. 2, and the tenth gear is established.

To establish the reverse gear, the second clutch C2 is brought into the coupling state, and the first brake B1 and second brake B2 are brought into the fixing state. The coupling state of the second clutch C2 causes the sun gear Sa (first element) in the first planetary gear mechanism PGS1 and the first rotational element Y1 to rotate at the same speed "1." The fixing state of the first brake B1 causes the rotational speed of the first connected member Ra-Sd to be "0."

The fixing state of the second brake B2 causes the rotational speed of the second rotational element Y2 to be "0." The rotational speed of the ring gear Rd (fourth element) in the fourth planetary gear mechanism PGS4 coupled to the output member 3 corresponds to "Rvs" indicating reverse rotation (rotation along a direction in which a vehicle moves backward) illustrated in FIG. 2, and the reverse gear is established.

Figure 3A:
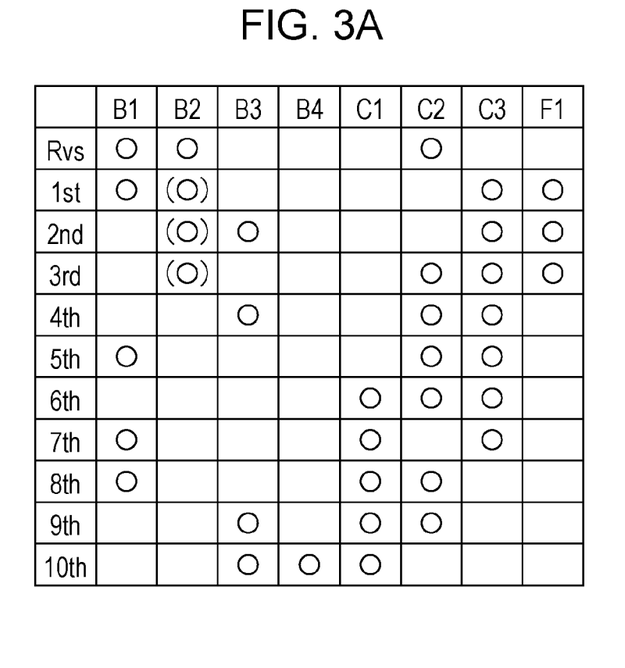
FIG. 3A illustrates a state of each engagement mechanism for each gear according to the first embodiment.

FIG. 3A illustrates states of the four brakes consisting of the first to fourth brakes B1 to B4, the three clutches consisting of the first to third clutches C1 to C3, and the one-way clutch F1 at each gear described above in table form. In the fields for the four brakes consisting of the first to fourth brakes B1 to B4 and the three clutches consisting of the first to third clutches C1 to C3 in this table, "O" indicates a coupling state or fixing state, and a blank field indicates a release state. In the fields for the one-way clutch F1, "O" indicates that the rotational speed of the second rotational element Y2 is made to be "0" by the action of the one-way clutch F1.

Figure 3B:
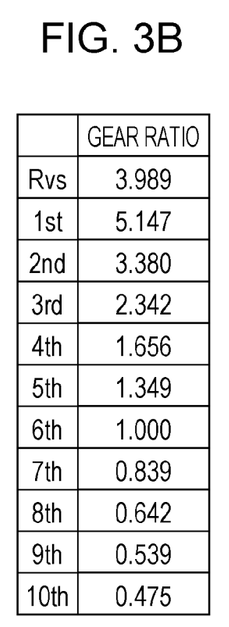
FIG. 3B illustrates an example of a gear ratio at each gear according to the first embodiment.
Figure 3C:
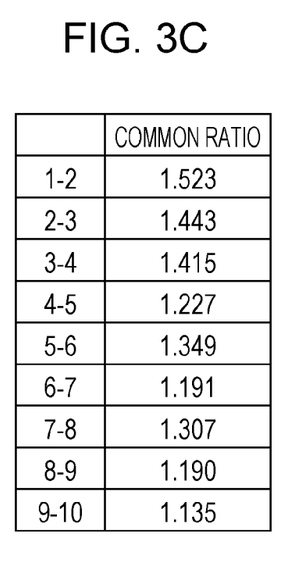
FIG. 3C illustrates an example of a common ratio between gear ratios of neighboring gears according to the first embodiment.
Figure 3D:
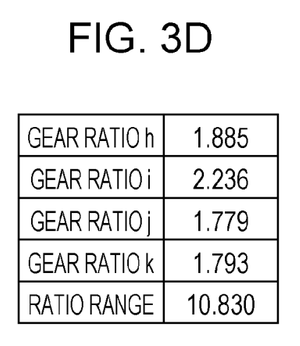
FIG. 3D illustrates an example of a gear ratio of each planetary gear mechanism and a ratio range of the automatic transmission according to the first embodiment.

FIG. 3B illustrates a gear ratio (rotational speed of the input shaft 2/rotational speed of the output member 3) at each gear when the gear ratio h of the first planetary gear mechanism PGS1 is 1.885, the gear ratio i of the second planetary gear mechanism PGS2 is 2.236, the gear ratio j of the third planetary gear mechanism PGS3 is 1.779, and the gear ratio k of the fourth planetary gear mechanism PGS4 is 1.793, as illustrated in FIG. 3D. With this, the common ratios (ratios between the gear ratios at neighboring gears) are appropriate, as illustrated in FIG. 3C, and the ratio range (gear ratio at the first gear/gear ratio at the tenth gear) illustrated in FIG. 3D is also appropriate.

With the present embodiment, 10 forward and 1 reverse gears can be made. The number of opened wet multi-plate clutches and wet multi-plate brakes that cause a friction loss at each gear is at or below four, the friction loss can be suppressed, and efficiency of transferring a driving force can be improved.

The seventh gear is defined as a predetermined medium-speed gear, the first gear through the seventh gear, which is the predetermined medium-speed gear, are defined as a low-speed gear range, and the eighth gear, which exceeds the seventh gear, which is the predetermined medium-speed gear, through the tenth gear are defined as a high-speed gear range. In the high-speed gear range, which is at or above the eighth gear, which exceeds the seventh gear, which is the predetermined medium-speed gear, the third clutch C3 is in a release state. The third clutch C3 is a meshing mechanism having a friction loss smaller than that of a wet multi-plate clutch.

The second brake B2, which is in a release state at all of the gears except for the reverse gear, is also a meshing mechanism. Accordingly, in the high-speed gear range, the number of opened wet multi-plate clutches and wet multi-plate brakes is two, a friction loss occurring when a vehicle runs at high speeds can be reduced, and fuel efficiency can be improved.

The third clutch C3, which is a meshing mechanism, is only switched between the coupling state and release state in a shift between the seventh gear, which is the predetermined medium-speed gear, and eighth gear. Because the transfer torque (transfer driving force) in the third clutch C3 at the seventh gear (predetermined medium-speed gear) is relatively small, even if the third clutch C3 is a dog clutch as the meshing mechanism, switching between the fixing state and release state in a shift between the seventh gear and eighth gear can be smoothly performed.

Because each if the four planetary gear mechanisms consisting of the first to fourth planetary gear mechanisms PGS1 to PGS4 is a single-pinion planetary gear mechanism, the number of engagements of the teeth of gears on the transfer path for the driving force can be smaller than that occurring when a double-pinion planetary gear mechanism that includes a sun gear, a ring gear, and a carrier that supports a pair of pinions meshing with each other, one of the pinions meshing with the sung gear and the other meshing with the ring gear, such that the pinions are rotatable about their respective axes and about the sun gear, is used, and transfer efficiency can be improved.

This double-pinion planetary gear mechanism is also called a plus planetary gear mechanism or positive planetary gear mechanism because when the carrier is fixed the sun gear and ring gear rotate in the same direction. When the ring gear is fixed the sun gear and carrier rotate in different directions.

Because the one-way clutch F1 is disposed in the vicinity of the second brake B2, it is not necessary to switch the state of the second brake B2 in a shift between the third and fourth gears, and controllability for changing the speed can be improved.

Each of the third clutch C3 and second brake B2 is a meshing mechanism in the present embodiment, as described above. Alternatively, if the third clutch C3 is a wet multi-plate clutch and the second brake B2 is a wet multi-plate brake, the advantageous effects of being able to suppress the number of opened wet multi-plate clutches and wet multi-plate brakes at each gear at or below four and being able to suppress a friction loss are also obtainable.

The one-way clutch F1 is optional. When the one-way clutch F1 is not included, the second brake B2 in establishing the first to third gears is in the fixing state. In the case where the one-way clutch F1 is not included, the second brake B2 may be a two-way clutch switchable between the fixing state where the second rotational element Y2 is fixed to the transmission case 1 and the reverse-rotation preventing state where forward rotation of the second rotational element Y2 is allowed and reverse rotation thereof is prevented.

Figure 4A:
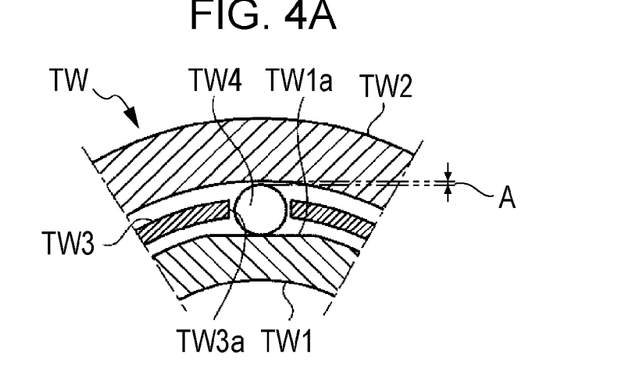
FIGS. 4A to 4C are cross-sectional views that illustrate an example of a two-way clutch as a second brake according to the first embodiment.
Figure 4B:
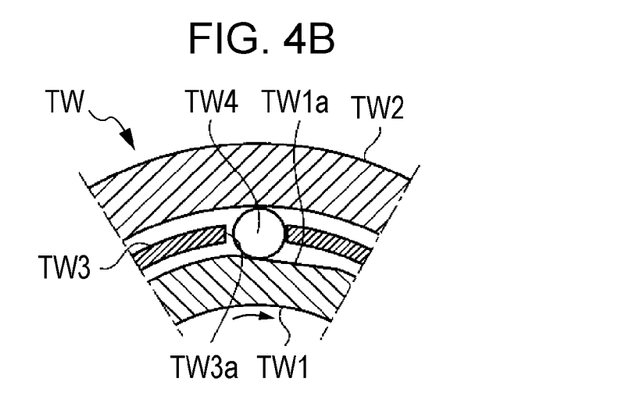
Figure 4C:
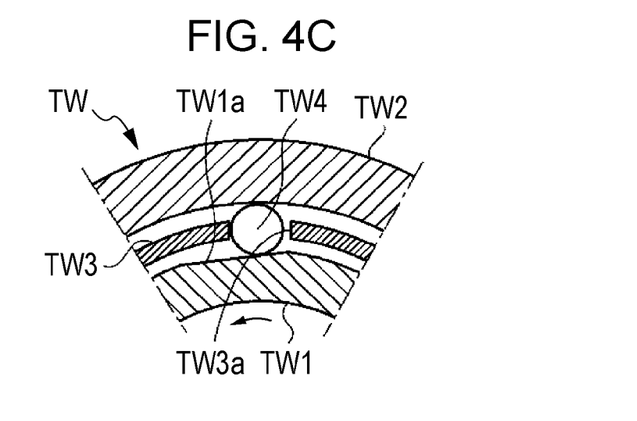

FIGS. 4A to 4C illustrate a two-way clutch TW as the second brake B2. The two-way clutch TW includes an inner ring TW1 coupled to the second rotational element Y2, an outer ring TW2, and a holding ring TW3 arranged between the inner ring TW1 and outer ring TW2. The outer ring TW2 is arranged outside in the radial direction of the inner ring TW1, spaced away from the inner ring TW1, and coupled to the transmission case 1.

The inner ring TW1 includes a plurality of cam surfaces TW1a in its outer peripheral surfaces. The holding ring TW3 includes a plurality of holes TW3a corresponding to the cam surfaces TW1a. Each of the holes TW3a houses a roller TW4.

The two-way clutch TW includes two electromagnetic clutches consisting of first and second electromagnetic clutches (not illustrated). The first electromagnetic clutch couples the outer ring TW2 and holding ring TW3 by being energized. The holding ring TW3 is configured such that it can rotate with respect to the inner ring TW1 and outer ring TW2 when the first electromagnetic clutch is not energized.

The diameter of the roller TW4 is set such that a space A is present when the roller TW4 is on a central portion of the cam surface TW1a, as illustrated in FIG. 4A, and such that the roller TW4 is in contact with the inner ring TW1 and outer ring TW2 when being on an end portion of the cam surface TW1a, as illustrated in FIGS. 4B and 4C.

Because when the first electromagnetic clutch is not energized the holding ring TW3 can rotate freely with respect to the inner ring TW1 and outer ring TW2, the roller TW4 can remain on the central portion of the cam surface TW1a, as illustrated in FIG. 4A. Accordingly, the two-way clutch TW is in a state where the inner ring TW1 can rotate freely.

When the first electromagnetic clutch is energized the holding ring TW3 is fixed to the transmission case 1 with the outer ring TW2 disposed therebetween. In this case, when the inner ring TW1 attempts to rotate forward or backward, because the holding ring TW3 is fixed, the roller TW4 is positioned on an end portion of the cam surface TW1a, as illustrated in FIGS. 4B and 4C.

At this time, the roller TW4 is sandwiched between the cam surface TW1a and the inner surface of the outer ring TW2, and the rotation of the inner ring TW1 is prevented. That is, the two-way clutch TW is in the fixing state.

The second electromagnetic clutch is switchable among a first holding state where, while the hole TW3a is positioned directly above a first end portion of the cam surface TW1a, the holding ring TW3 is coupled to the inner ring TW1, as illustrated in FIG. 4B, a second holding state where, while the hole TW3a is positioned directly above a second end portion of the cam surface TW1a, the holding ring TW3 is coupled to the inner ring TW1, as illustrated in FIG. 4C, and a release state where the holding ring TW3 and inner ring TW1 are decoupled.

When the clockwise direction in FIGS. 4A to 4C is a reverse direction, the two-way clutch TW is brought into the reverse-rotation preventing state by decoupling the outer ring TW2 and the holding ring TW3 as the state where the first electromagnetic clutch is not energized (energization-off state) and bringing the second electromagnetic clutch into the first holding state.

When the second brake B2 is the above-described two-way clutch TW, each gear can be established by the two-way clutch TW becoming the fixing state at the forward first to third gears and the reverse gear and becoming the reverse-rotation preventing state at the forward fourth through tenth gears.

When the second brake B2 is the above-described two-way clutch TW, no friction loss occurs in the second brake B2, unlike when the second brake B2 is a frictional engagement brake. Accordingly, a friction loss can be suppressed in the automatic transmission as a whole, as in the case where the second brake B2 is a meshing mechanism.

When it is estimated that the gear is to be shifted up into fourth during running at the third gear on the basis of vehicle information, such as a running speed, the transmission control unit (not depicted) may preferably switch in advance the two-way clutch TW as the second brake B2 to the reverse-rotation preventing state.

With this, like the advantageous effect of the one-way clutch F1, in shifting up the gear from third to fourth, the switching of the state of the two-way clutch TW as the second brake B2 has been completed, and the fourth gear can be achieved simply by bringing the third brake B3 into the fixing state. Thus, the gear can be shifted up into fourth smoothly, and controllability for changing the speed in the automatic transmission can be improved.

The two-way clutch TW having the above-described configuration is also switchable to a release state where fixing of the second rotational element Y2 to the transmission case 1 is released and a forward-rotation preventing state where forward rotation of the second rotational element Y2 is prevented and reverse rotation thereof is allowed, in addition to the above-described fixing state and reverse-rotation preventing state.

Specifically, when the first electromagnetic clutch is brought into the energization-off state and the second electromagnetic clutch is brought into the release state, the two-way clutch TW becomes the state where the roller TW4 remains on the central portion of the cam surface TW1$a$ and the state where the inner ring TW1 can rotate freely with respect to the outer ring TW2, that is, the release state, as illustrated in FIG. 4A.

When the first electromagnetic clutch is brought into the energization-off state and the second electromagnetic clutch is brought into the second holding state where, while the hole TW3$a$ is positioned directly above the second end of the cam surface TW1$a$, the holding ring TW3 is coupled to the inner ring TW1, as illustrated in FIG. 4C, the two-way clutch TW becomes the state where forward rotation of the inner ring TW1 is prevented and reverse rotation thereof is allowed, that is, the forward-rotation preventing state.

Accordingly, the second electromagnetic clutch in the above-described two-way clutch TW may be omitted, and the two-way clutch TW as the second brake B2 may be only switchable between the fixing state and the release state by switching of the first electromagnetic clutch. In this case, each gear can be established by making the two-way clutch TW be in the fixing state at from the forward first through third gear and the reverse gear and be switched to the release state at from the fourth through tenth gear.

The 10 forward gears are described in the first embodiment. However, the automatic transmission may achieve gears other than the 10 forward gears. For example, the second, fourth, and ninth gears may be omitted, and seven forward gears may be achieved.

The fourth planetary gear mechanism PGS4 may be arranged outside in the radial direction of the first planetary gear mechanism PGS1, and the ring gear Ra (third element) in the first planetary gear mechanism PGS1 and the sun gear Sd (sixth element) in the fourth planetary gear mechanism PGS4 forming the first connected member Ra-Sd may be integrally coupled to each other, as in a second embodiment described below. With this, the axial length can be further reduced.

Figure 5:
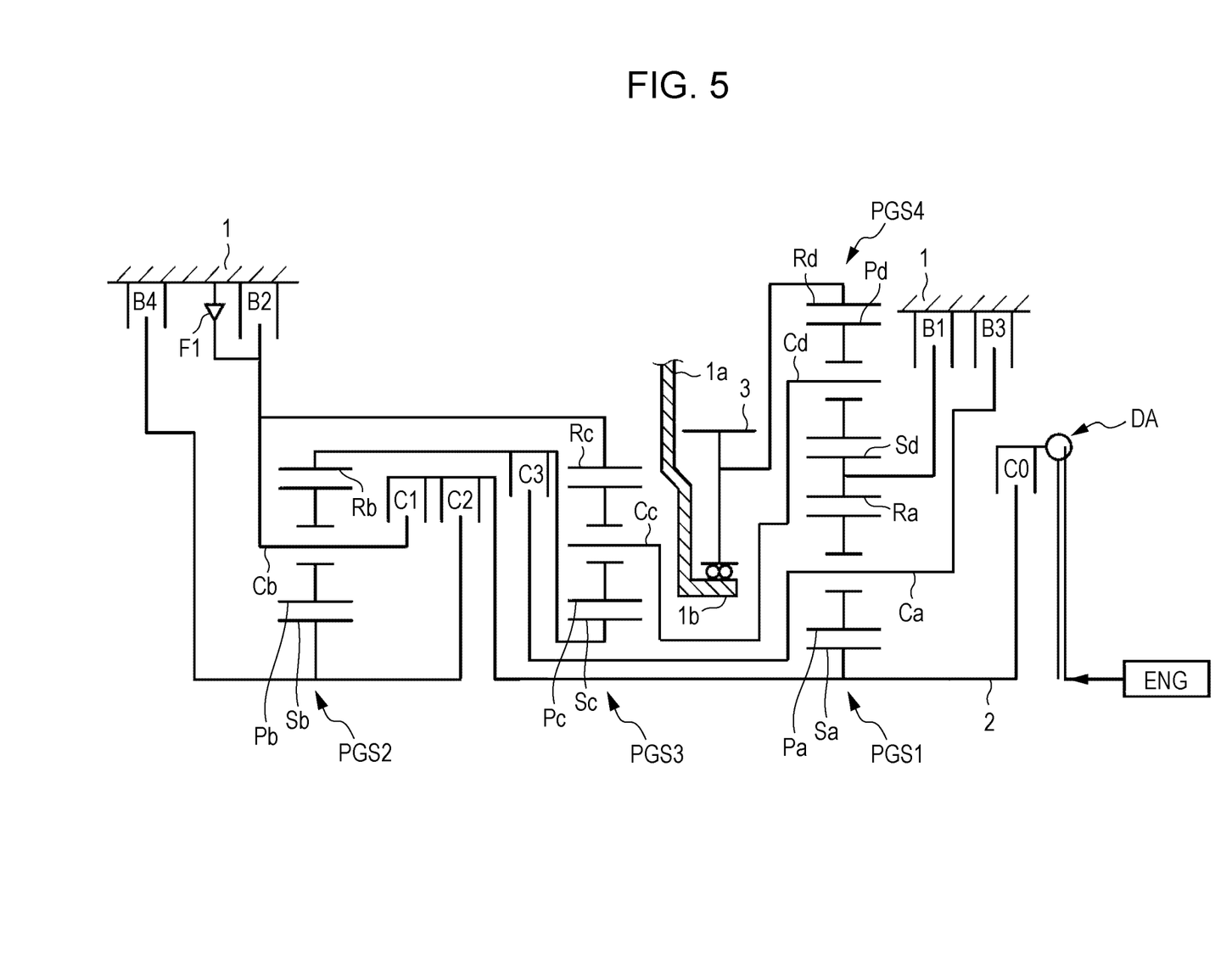
FIG. 5 is a schematic diagram that illustrates an upper half portion of the automatic transmission according to a second embodiment.

FIG. 5 illustrates an upper half portion of the automatic transmission according to the second embodiment. This automatic transmission differs from the automatic transmission illustrated in FIG. 1 in the following respects. That is, the automatic transmission includes a single-plate or multi-plate starting clutch CO, in place of the torque converter illustrated in FIG. 1. The starting clutch CO can transfer a driving force from the driving source ENG to the input shaft 2 using the damper DA and frictional engagement.

The third planetary gear mechanism PGS3 is not arranged outside in the radial direction of the second planetary gear mechanism PGS2, but is arranged between the first planetary gear mechanism PGS1 and the third clutch C3. The fourth planetary gear mechanism PGS4 is arranged outside in the radial direction of the first planetary gear mechanism PGS1. The ring gear Ra (third element) in the first planetary gear mechanism PGS1 and the sun gear Sd (sixth element) in the fourth planetary gear mechanism PGS4 forming the first connected member Ra-Sd are integrally coupled to each other.

The output member 3 including the output gear is arranged between the first planetary gear mechanism PGS1 and the third planetary gear mechanism PGS3. In addition, each of the second brake B2 and third clutch C3 is a wet multi-plate clutch.

The other respects are the same as those in the first embodiment illustrated in FIG. 1. Accordingly, each gear can be established in the same manner in accordance with the state of each of the engagement mechanisms illustrated in FIG. 3A.

The automatic transmission according to the present embodiment can provide the same operational advantages as in the first embodiment. In place of the starting clutch C0, the torque converter may be included, as in the first embodiment. The third planetary gear mechanism PGS3 may be arranged outside in the radial direction of the second planetary gear mechanism PGS2, and the ring gear Rb in the second planetary gear mechanism PGS2 and the sun gear Sc in the third planetary gear mechanism PGS3 being integrally coupled to each other may form the fourth rotational element Y4.

The present application is not limited to the above-described embodiments.

[1] An automatic transmission according to an embodiment includes an input shaft rotatably supported in a transmission case and rotated by power from a driving source, four planetary gear mechanisms consisting of first to fourth planetary gear mechanisms, and seven engagement mechanisms consisting of first to third clutches and first to fourth brakes. The automatic transmission changes a speed of rotation of the input shaft to any of a plurality of speeds and outputting the rotation through an output member. Each of the first to fourth planetary gear mechanisms includes three elements consisting of a sun gear, a carrier, and a ring gear. The elements of the second and third planetary gear mechanisms form four rotational elements. In a collinear diagram that illustrates a ratio among relative rotational speeds of the four rotational elements using straight lines, the four rotational elements are defined as a first rotational element, a second rotational element, a third rotational element, and a fourth rotational element in sequence from one side. In a collinear diagram that illustrates a ratio among relative rotational speeds of the three elements of the first planetary gear mechanism using straight lines, the three elements arranged at intervals corresponding to a gear ratio thereof are defined as a first element, a second element, and a third element in sequence from one side. In a collinear diagram that illustrates a ratio among relative rotational speeds of the three elements of the fourth planetary gear mechanism using straight lines, the three elements arranged at intervals corresponding to a gear ratio thereof are defined as a fourth element, a fifth element, and a sixth element in sequence from one side. The first element is coupled to the input shaft. The fourth element is coupled to the output member. The third element and the sixth element being coupled to each other forms a first connected member. The third element and the fifth element being coupled to each other forms a second connected member. The first clutch is capable of coupling the first element and the second rotational element. The second clutch is capable of coupling the first element and the first rotational element. The third clutch is capable of coupling the second element and the fourth rotational element. The first brake is capable of fixing the first connected member to the transmission case. The second brake is capable of fixing the second rotational element to the transmission case. The third brake is capable of fixing the second element to the transmission case. The fourth brake is capable of fixing the first rotational element to the transmission case. The automatic transmission establishes 10 forward gears by bringing at least three of the seven engagement mechanisms into the coupling state or the fixing state.

The automatic transmission according to the embodiment can achieve 10 or more forward gears. Three engagement mechanisms out of the seven engagement mechanisms consisting of the three clutches and four brakes are engaged, and they are in the coupling state or fixing state. Thus, the number of engagement mechanisms that are not in the coupling state or fixing state and that are opened at each gear is four. The automatic transmission can increase the number of gears to 10 or more forward gears without increasing a friction loss caused by the engagement mechanisms, unlike a known automatic transmission in which only up to eight forward gears are established and four engagement mechanisms are opened at each gear. Accordingly, fuel efficiency of a vehicle can be improved by an increased number of gears without decreasing transfer efficiency in the automatic transmission.

[2] In the automatic transmission according to the embodiment, the third planetary gear mechanism may be arranged outside in a radial direction of the second planetary gear mechanism, and the sun gear in the third planetary gear mechanism and the ring gear in the second planetary gear mechanism being integral with each other may form one of the four rotational elements consisting of the first to fourth rotational elements.

With this configuration of the embodiment, because the third planetary gear mechanism and the second planetary gear mechanism overlap each other in the radial direction, the axial length of the automatic transmission is shorter than that when the third planetary gear mechanism and the second planetary gear mechanism are arranged along the axis of the input shaft. Thus, the degree of freedom in the design of the automatic transmission mounted on a vehicle, in particular, a front-engine, front-drive (FF) car can be enhanced.

[3] In the automatic transmission according to the embodiment, the ring gear in the first planetary gear mechanism and the sun gear in the fourth planetary gear mechanism being coupled to each other may form the first connected member, the fourth planetary gear mechanism may be arranged outside in a radial direction of the first planetary gear mechanism, and the sun gear in the fourth planetary gear mechanism and the ring gear in the first planetary gear mechanism may be integral with each other.

With this configuration of the embodiment, because the fourth planetary gear mechanism and first planetary gear mechanism overlap each other in the radial direction, the axial length of the automatic transmission can be reduced.

[4] The automatic transmission according to the embodiment may include a one-way clutch that allows forward rotation of the second rotational element and prevents reverse rotation thereof. With this, as is clear from the description of the embodiments below, the engagement force of the second brake can be small, the friction loss in the second brake can be suppressed, and controllability for changing the speed in the automatic transmission can be improved.

[5] In the automatic transmission according to the embodiment, at least one of the second brake and the third brake may include a meshing mechanism, such as a dog clutch or a synchromesh mechanism. Because the meshing mechanism causes no friction loss, the friction loss of a gear where either the second brake or the third clutch is in a release state can be further suppressed, and fuel efficiency of a vehicle can be improved.

[6] In the automatic transmission according to the embodiment, the second brake may include a two-way clutch switchable between a fixing state where the second rotational element is fixed to the transmission case and a reverse-rotation preventing state where forward rotation of the second rotational element is allowed and reverse rotation thereof is prevented. With this configuration, the friction loss can also be further reduced, and controllability for changing the speed can be improved.

[7] The automatic transmission according to the embodiment may further include a starting clutch capable of transferring the power from the driving source to the input shaft.

[8] In the automatic transmission according to the embodiment, the power from the driving source may be transferred to the input shaft through a torque converter.

Obviously, numerous modifications and variations of the present invention are possible in light of the above teachings. It is therefore to be understood that within the scope of the appended claims, the invention may be practiced otherwise than as specifically described herein.

What is claimed is:
1. An automatic transmission comprising:
an input shaft rotatably supported in a transmission case and rotatable by power from a driving source, a rotational speed of the input shaft being changeable to any of a plurality of rotational speeds to be output through an output member;
a first planetary gear mechanism including a first sun gear, a first carrier, and a first ring gear which are defined as a first element, a second element, and a third element;
a second planetary gear mechanism including a second sun gear, a second carrier, and a second ring gear;
a third planetary gear mechanism including a third sun gear, a third carrier, and a third ring gear, the second sun gear, the second carrier, the second ring gear, the third sun gear, the third carrier, and the third ring gear being defined as first to fourth rotational elements;
a fourth planetary gear mechanism including a fourth sun gear, a fourth carrier, and a fourth ring gear which are defined as a fourth element, a fifth element, and a sixth element, the first element being coupled to the input shaft, the fourth element being coupled to the output member, the third element and the sixth element being coupled to each other to form a first connected member, the third rotational element and the fifth element being coupled to each other to form a second connected member;
a first engagement device switchable between an engagement state where the first element is connected to the second rotational element and a release state where the first element is disconnected from the second rotational element;
a second engagement device switchable between an engagement state where the first element is connected to the first rotational element and a release state where the first element is disconnected from the first rotational element;

a third engagement device switchable between an engagement state where the second element is connected to the fourth rotational element and a release state where the second element is disconnected from the fourth rotational element;

a fourth engagement device switchable between an engagement state where the first connected member is connected to the transmission case and a release state where the first connected member is disconnected from the transmission case;

a fifth engagement device switchable between an engagement state where the second rotational element is connected to the transmission case and a release state where the second rotational element is disconnected from the transmission case;

a sixth engagement device switchable between an engagement state where the second element is connected to the transmission case and a release state where the second element is disconnected from the transmission case; and a seventh engagement device switchable between an engagement state where the first rotational element is connected to the transmission case and a release state where the first rotational element is disconnected from the transmission case, ten forward gears of the automatic transmission being established by bringing at least three of the first to seventh engagement devices into the engagement state.

2. The automatic transmission according to claim 1,
wherein the third planetary gear mechanism is arranged outside the second planetary gear mechanism in a radial direction of the second planetary gear mechanism, and
wherein the third sun gear and the second ring gear are integral with each other to form one of the first to fourth rotational elements.

3. The automatic transmission according to claim 1,
wherein the first ring gear and the fourth sun gear are coupled to each other to form the first connected member,
wherein the fourth planetary gear mechanism is arranged outside the first planetary gear mechanism in a radial direction of the first planetary gear mechanism, and
wherein the fourth sun gear and the first ring gear are integral with each other.

4. The automatic transmission according to claim 1, further comprising:
a one-way engagement device to allow forward rotation of the second rotational element and to prevent reverse rotation of the second rotational element.

5. The automatic transmission according to claim 1, wherein at least one of the third and fifth engagement devices comprises a meshing mechanism.

6. The automatic transmission according to claim 1, wherein the fifth engagement device comprises a two-way clutch switchable between an engagement state where the second rotational element is connected to the transmission case and a reverse-rotation preventing state where forward rotation of the second rotational element is allowed and reverse rotation of the second rotational element is prevented.

7. The automatic transmission according to claim 1, further comprising:
a starting clutch to transfer the power from the driving source to the input shaft.

8. The automatic transmission according to claim 1, further comprising:
a torque converter to transfer the power from the driving source to the input shaft.

9. The automatic transmission according to claim 1,
wherein the first sun gear is defined as a first element,
wherein the first carrier is defined as a second element, and
wherein the first ring gear is defined as a third element.

10. The automatic transmission according to claim 1,
wherein the fourth sun gear is defined as a sixth element,
wherein the fourth carrier is defined as a fifth element, and
wherein the fourth ring gear is defined as a fourth element.

11. The automatic transmission according to claim 1,
wherein the second sun gear is defined as the first rotational element,
wherein the second carrier and the third ring gear are connected to each other to be defined as the second rotational element,
wherein the third carrier is defined as the third rotational element, and
wherein the second ring gear and the third sun gear are connected to each other to be defined as the fourth rotational element.

12. The automatic transmission according to claim 1,
wherein the first sun gear is defined as a first element,
wherein the first carrier is defined as a second element,
wherein the first ring gear is defined as a third element,
wherein the fourth ring gear is defined as a fourth element,
wherein the fourth carrier is defined as a fifth element,
wherein the fourth sun gear is defined as a sixth element,
wherein the second sun gear is defined as the first rotational element,
wherein the second carrier and the third ring gear are connected to each other to be defined as the second rotational element,
wherein the third carrier is defined as the third rotational element, and
wherein the second ring gear and the third sun gear are connected to each other to be defined as the fourth rotational element.

* * * * *